United States Patent [19]

Hongu et al.

[11] 4,322,751
[45] Mar. 30, 1982

[54] DETECTOR CIRCUIT FOR A TELEVISION RECEIVER

[75] Inventors: Masayuki Hongu, Kawasaki; Shigeru Ohmuro, Higashimine; Masaharu Tokuhara, Tokyo, all of Japan

[73] Assignee: Sony Corporation, Tokyo, Japan

[21] Appl. No.: 89,908

[22] Filed: Oct. 31, 1979

[30] Foreign Application Priority Data

Nov. 10, 1978 [JP] Japan ................................. 53-138575

[51] Int. Cl.³ .......................... H04N 5/50; H04N 5/62; H04B 1/16
[52] U.S. Cl. ................................. 358/195.1; 358/197; 455/260; 455/265; 455/192
[58] Field of Search ........................... 358/195.1, 197; 455/192, 260, 265; 331/20; 329/50

[56] References Cited

U.S. PATENT DOCUMENTS

| | | | |
|---|---|---|---|
| 3,939,424 | 2/1976 | Shimizu et al. | 455/265 |
| 4,091,421 | 5/1978 | Long | 358/195.1 |
| 4,156,255 | 5/1979 | Hongu et al. | 358/195.1 |
| 4,163,259 | 7/1979 | Skerlos | 358/195.1 |
| 4,199,786 | 4/1980 | Orii | 358/197 |

Primary Examiner—Jin F. Ng
Attorney, Agent, or Firm—Lewis H. Eslinger; Alvin Sinderbrand

[57] ABSTRACT

A synchronous detector suitable for use in a color television receiver detects both a video signal and an audio IF signal, but in a fashion in which these two signals do not interfere with one another. In the detector, a tuner provides an IF signal in which the video signal and audio or sound IF signals are modulated on a carrier; a signal generator, such as a phase-locked loop, provides both a detecting signal synchronized with the carrier of the IF signal, and a comparing signal having the same frequency as the carrier of the IF signal but phase-shifted $\pi/2$ therefrom; a synchronous detecting circuit for synchronously detecting the IF signal by the detecting signal to produce the video signal; and a phase comparator for phase comparing the IF signal with the comparing signal to provide the sound IF signal. In one arrangement, the phase comparator provides a filtered version of the sound IF signal as an AFT control signal to control the fine tuning of the tuner. In another embodiment, two phase comparators are included so that the sound IF signal and the AFT control signal are provided separately.

6 Claims, 6 Drawing Figures

DETECTOR CIRCUIT FOR A TELEVISION RECEIVER

BACKGROUND OF THE INVENTION

1. Field of the Invention

This invention relates generally to television receivers, and is directed more particularly to a detecting circuit in television receiver in which a sound signal of high quality can be derived from a received television signal.

2. Description of the Prior Art

In FIGS. 1 and 2 which are block diagrams showing prior art color television receivers, 1 designates an antenna for receiving a broadcast color television signal which is supplied through a high frequency amplifier 2 to a mixer circuit 3 which is also supplied with a signal from a local oscillator 4. A resulting frequency converted signal from the mixer 3 is supplied through a band pass filter 5 as a video intermediate frequency (VIF) signal to a VIF amplifier 6. Here, the band pass filter 5 has predetermined response peak at the video carrier frequency of 58.75 $MH_z$, at the sound carrier frequency of 54.25 $MH_z$, and at the carriers of the video and sound signals in the adjacent channels on either side.

In the prior art example shown in FIG. 1, the VIF signal from the VIF amplifier 6 is supplied through a sound trap circuit 7 to a video detector 8, which is usually a diode detector. The VIF signal and sound signal component are supplied from an intermediate stage of the sound trap circuit 7 to a band pass filter 9 which selectively passes these signals to a detector 10, which is also usually a diode detector. A video signal including the carrier color signal is provided at an output terminal 11 of the video detector 8 and a sound intermediate frequency (SIF) signal is provided at an output terminal 12 of the detector 10. To obtain the sound signal the SIF signal is applied from the output terminal 12 to a tuning circuit of 4.5 $MH_z$ (not shown).

In the prior art example of FIG. 2 a synchronous detector is used, as the video detector stage. In this example, the VIF signal from the VIF amplifier 6 is supplied to a band pass filter 13 and then via a limiter 14 as a carrier of 58.75 $MH_z$ to one input of a multiplier circuit 15. The VIF signal from the VIF amplifier 6 is supplied directly to another input of the multiplier 15. One output terminal 11 of the multiplier 15 provides the video signal and another outut terminal 12 of the multiplier 15 provides the SIF signal via a tuning circuit of 4.5 $MH_z$ (not shown) to the output terminal 12.

If the characteristic of the band pass filter 5 is ignored, as is done here for the sake of brevity, the amplitude-to-frequency characteristic of the output from the detector 10 in FIG. 1 or from the multiplier 15 in FIG. 2 is flat, as shown in the graph of FIG. 3. Therefore, in both the prior art examples of FIGS. 1 and 2, in order to separate out the SIF signal from any video signal component mixed therewith, and to avoid mutual interference (or so-called "buzz") between the video signal and the SIF signal, it is necessary to include a band pass filter having a sharp characteristic with a 4.5 $MH_z$ center frequency as shown in the graph of FIG. 3 by the broken line, connected to the output terminal 12.

OBJECTS AND SUMMARY OF THE INVENTION

Accordingly, an object of the present invention is to provide a novel television receiver which avoids the defects inherent in the prior art.

Another object of the invention is to provide a television receiver in which a detector having a band pass characteristic different from the flat characteristic shown in the graph of FIG. 3 is used to produce at its output terminal a high quality SIF signal containing an insignificant amount of interfering video signal components.

According to an aspect of the present invention, a television receiver comprises a tuner for providing a VIF signal in which video and SIF signals are modulated on an IF carrier; a signal generator, such as a phase-locked loop, which provides both a detecting signal synchronized with the IF carrier, and a comparing signal having the same frequency as the IF carrier, but phase-shifted $\pi/2$ therefrom; a synchronous detecting circuit for synchronously detecting the IF signal by the detecting signal to produce the video signal; and a phase comparator for phase comparing the IF signal with the comparing signal to provide the sound IF signal.

Other objects, features and advantages of the present invention will be clear from the following description taken in conjunction with the accompanying drawings through which the like reference numerals designate the same elements.

DESCRIPTION OF THE PREFERRED EMBODIMENTS

The present invention will be hereinbelow described with reference to the attached drawings.

Figure 1:
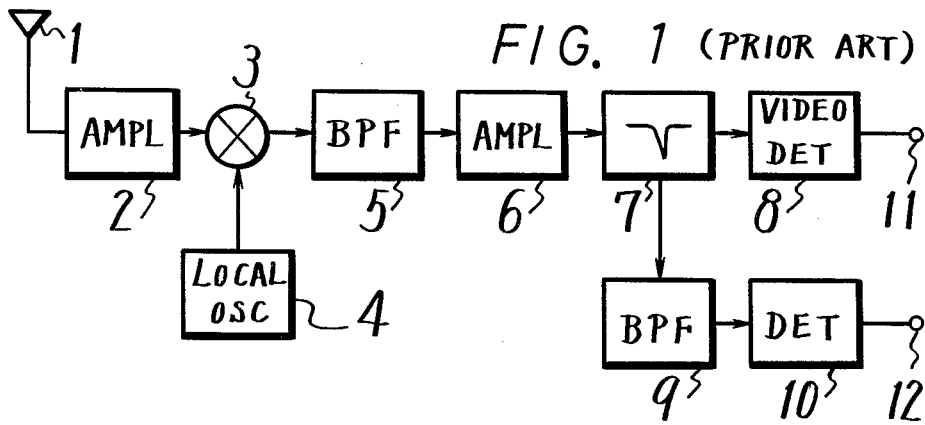
FIGS. 1 and 2 are block diagrams showing tuning and detecting circuits of prior art television receivers.
Figure 2:
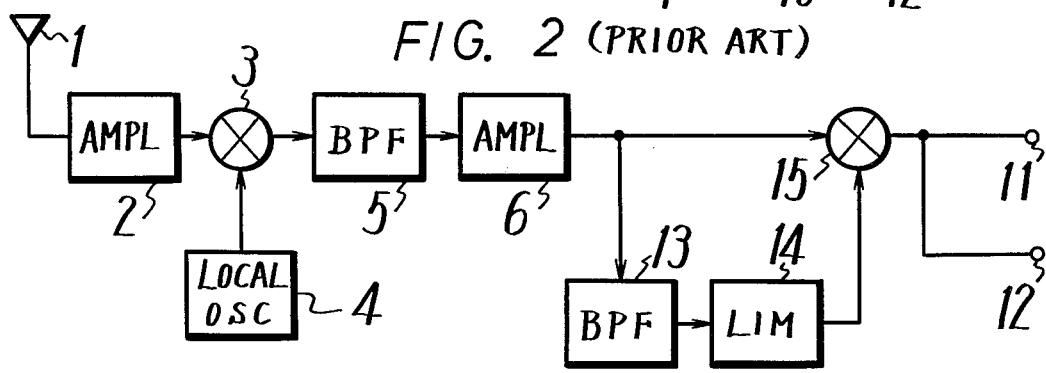
Figure 3:
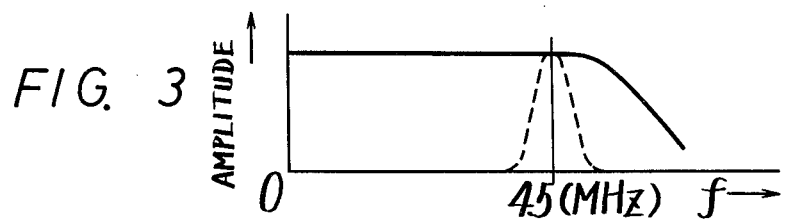
FIG. 3 is a graph showing an amplitude-to-frequency characteristic and is used for explaining the circuits of the prior art television receivers shown in FIGS. 1 and 2.

A first example of the invention will be now described with reference to FIG. 4 in which the same reference numerals same as used in FIG. 1 and 2 designate the same elements. In the example of the invention shown in FIG. 4, the VIF signal from the VIF amplifier 6 is supplied to the multiplier 15 to be synchronously detected, which then provides a detected video signal at the output terminal 11. In order to reproduce the carrier for the synchronous detection, phase-locked loop (PLL) is provided. The PLL circuit includes a VCO (voltage controlled oscillator) 16, a $\pi/2$ phase shifter 17, and a phase comparator formed of a multiplier 18 and a low pass filter 19. The VIF signal from the VIF amplifier 6 and the output signal from the VCO 16, which is passed through the $\pi/2$ phase shifter 17, are supplied to the phase comparator 18, and the compared output therefrom is supplied through the low pass filter 19 to the VCO 16 as its control voltage. Thus, the VCO 16 generates a detecting signal which is synchronized with the carrier of the VIF signal, and this detecting signal and the VIF signal are supplied to the multiplier 15 to thereby carry out synchronous detection of the video signal.

The compared output from the phase comparator 18 is amplified in a DC amplifier 20 and then filtered in a low pass filter 21 to serve as an AFT (automatic fine tuning) voltage.

This AFT voltage then controls the tuning of the local oscillator 4. In this example, the cut-off frequencies of the low pass filter 21 and low pass filter 19 of the PLL circuit are each selected to be very low in comparison with the frequency of the SIF signal.

Figure 4:
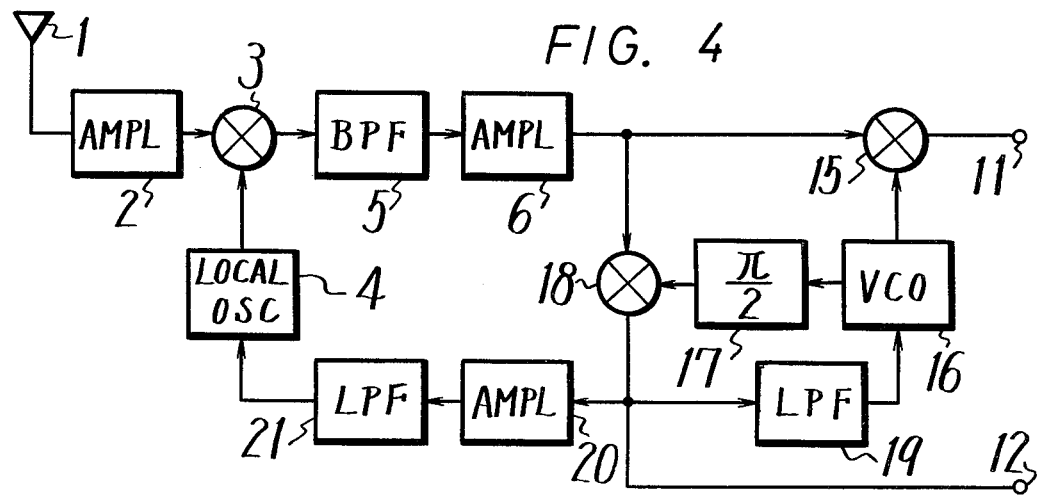
FIG. 4 is a block diagram showing an example of the tuning and detecting circuit of a television receiver according to the present invention.

In the example of FIG. 4, the output from the phase comparator 18 in the PLL circuit, which is provided so as to reproduce the carrier, is also delivered to the output terminal 12 as the SIF signal. It is also possible to obtain the carrier color signal at output terminal 12. In such case, in order to provide the SIF signal and carrier color signal separately, a band pass filter (not shown) for deriving the SIF signal and a trap circuit (not shown) for blocking the SIF signal and passing the carrier color signal would be connected to the output terminal 12.

Figure 5:
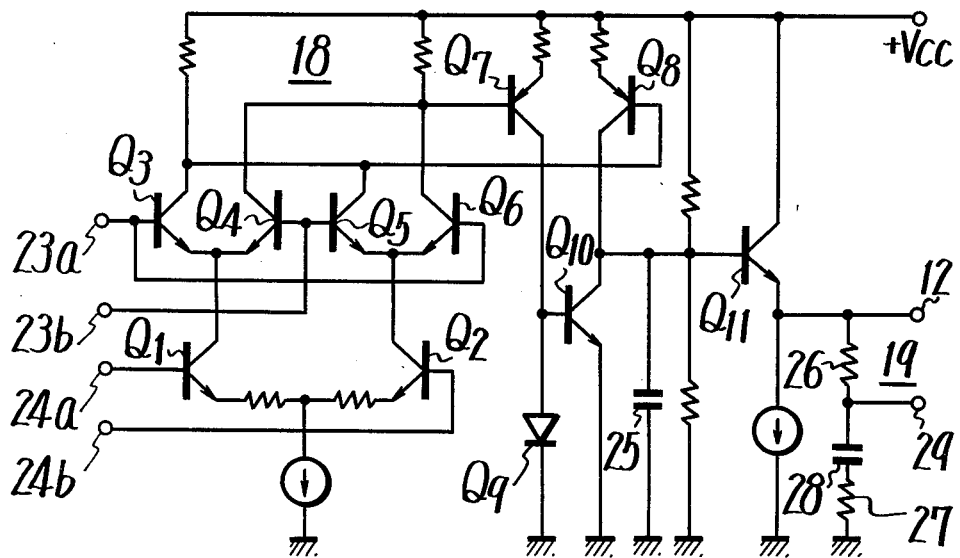
FIG. 5 is a connection diagram of a portion of the circuit shown in FIG. 4.

FIG. 5 shows a practical connection diagram of the above example of the invention. In the example shown in FIG. 5, transistors Q1 to Q6 form the phase comparator 18, which is of the double-balanced connection type. Input terminals 23a and 23b thereof are supplied with a phase-shifted version of the output signal from the VCO 16 via the $\pi/2$ phase shifter 17, while input terminals 24a and 24b of the phase comparator 18 are supplied with the VIF signal. The output signal from the phase comparator 18 is supplied through a amplifier, which is formed of transistors Q7, Q8, Q10 and a diode Q9, to the base of a transistor Q11. A low-value capacitor 25 is provided between the amplifier and the transistor Q11 to remove undersired signals of higher frequency than the SIF signal. The transistor Q11, arranged in emitter follower consideration, has its emitter connected to the output terminal 12. Thus, the SIF signal is taken from the output terminal 12. The emitter of the transistor Q11 is also connected through the low pass filter 19, which consists of resistors 26, 27 and a capacitor 28, to an output terminal 29 at which the control voltage for the VCO 16 is obtained.

In the above example of the present invention, the amplitude-to-frequency characteristic of the compared output from the phase comparator 18 is not flat, but exhibits a band pass characteristic with a 4.5 MH$_z$ center frequency for the SIF signal. This will be now described.

When the input signal to the phase comparator 18 includes both the upper and lower side band components, the wave function of the input signal can be generally expressed by the following function:

$$f(t) = (1 + m \cos \omega t) \cos \omega_p t \quad (1)$$

where m is the modulation index, cos $\omega_p t$ is the wave function of the carrier wave and cos $\omega_v t$ is the wave function of the modulating wave (here the SIF signal). If it happens that a PLL circuit is synchronized with respect to the input signal, the carrier wave g(t) from the $\pi/2$ phase shifter 17 can be expressed as follows:

$$g(t) = \sin \omega_p t \quad (2)$$

Accordingly, since the output h(t) from the phase comparator 18 is a linearly multiplied output function of f(t) and g(t), h(t) can be expressed the following product of f(t) and g(t):

$$\begin{aligned} h(t) = f(t) \cdot g(t) &= (1 + m \cos \omega_v t) \cos \omega_p t \cdot \sin \omega_p t \quad (3) \\ &= \tfrac{1}{2}(1 + m \cos \omega_v t) \{\sin (\omega_p + \omega_p)t + \sin (\omega_p - \omega_p)t\} \\ &= \tfrac{1}{2}(1 + m \cos \omega_v t) \sin (2 \omega_p t) \end{aligned}$$

When the output h(t) passes through the low pass filter 19, the component $(2\omega_p t)$ in the expression (3) is filtered out and removed, and hence the output h(t) can be expressed as follows:

$$h(t) = 0 \quad (4)$$

If, instead, the input signal to the phase comparator 18 includes only one side band component, this input can be expressed as follows:

$$f(t) = \cos \omega_v t + \cos \omega_p t \quad (5)$$

Since the carrier wave g(t) from the $\pi/2$ phase shifter 17 is expressed by the equation (2) whenever the PLL circuit is synchronized with the input signal, the output h(t) from the phase comparator 18 is expressed as follows:

$$\begin{aligned} h(t) = f(t) \cdot g(t) &= (\cos \omega_v t + \cos \omega_p t) \sin \omega_p t \quad (6) \\ &= \tfrac{1}{2}\{\sin 2 \omega_p t + \sin (\omega_p + \omega_v)t + \sin (\omega_p - \omega_v)t\} \end{aligned}$$

If the output of phase comparator 18 is passed through a suitable low pass filter, the output h(t) can be expressed as follows:

$$h(t) = \tfrac{1}{2} \sin (\omega_p - \omega_v)t \quad (7)$$

As may be apparent from the above description, the output from the phase comparator 18 includes only a single side band component. As is well known, a television signal is normally transmitted in the residual side band made, that is, in the frequencies from 0 to 0.75 MH$_z$ the upper and lower side band components of the video signal are transmitted, while in the frequencies higher than 1.25 MH$_z$ the lower side band component is completely removed and only the upper side band component is transmitted. Thus, the the SIF signal of 4.5 MH$_z$ and the carrier color signal of 3.58 MH$_z$ are contained in the upper sideband, and they are not found in the lower side band component. And, if in the equation (7) the term $(\omega_p - \omega_v) = 4.5$ MH$_z$, the SIF signal can be derived from the output signal from the phase comparator 18. The two side band components corresponding to signals lower than 0.75 MH$_z$ do not appear in the output signal from the phase comparator 18. In order to remove the unnecessary components of sin $(2\omega_p t)$ and sin $(\omega_p + \omega_v)t$ in the equation (6), a capacitor 25 can be included connected to the base of the amplifier Q11, which will amplify the output signal from the phase comparator 18, as shown in FIG. 5. However, stray capacity such as the base capacity of the transistor Q11, is usually sufficient so that the capacitor 25 can be omitted.

As will be understood from the above discussion, according to the present invention, the phase comparator 18 itself has a frequency-selective characteristic. Thus, the SIF signal, substantially free of undesired signal components (video signal components), is presented at the output terminal 12. If a band pass filter is connected to the output terminal 12 so as to further develop the SIF signal component, even though such a band pass filter simple inexpensive design, undesired signal components can be further suppressed. By this invention, not only a high-quality SIF signal but the carrier color signal as well, in which interfering video signal components are suppressed, can be derived from the output terminal 12, so that cross-color jamming can be minimized.

Figure 6:
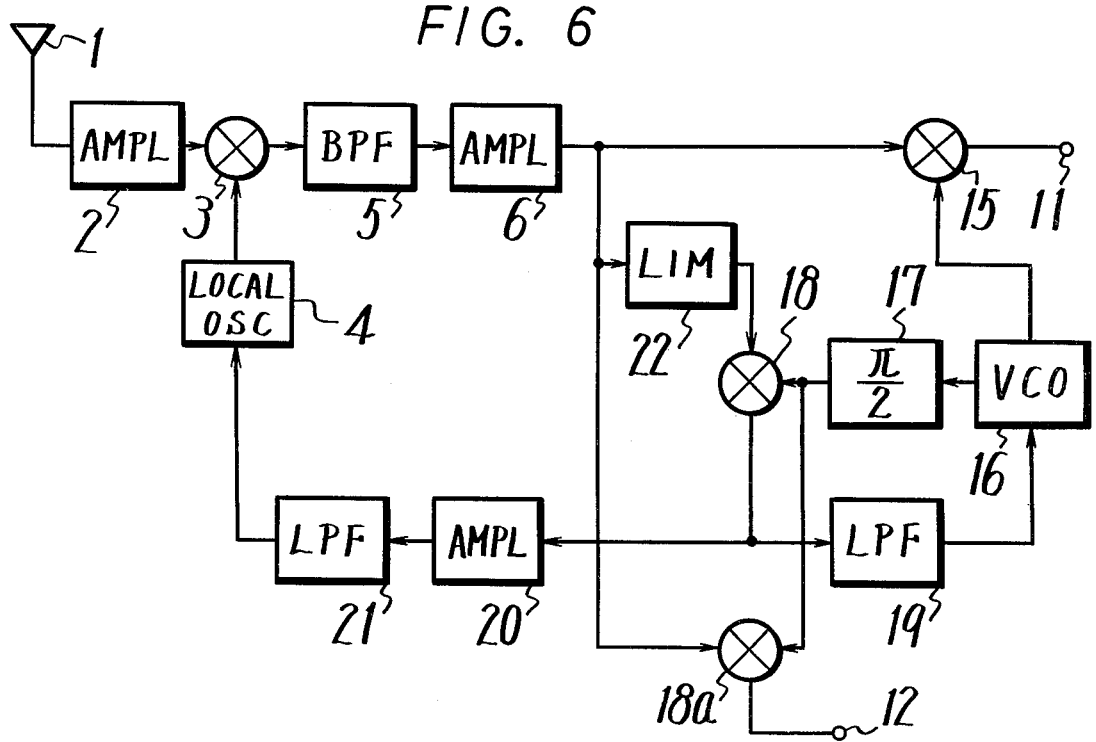
FIG. 6 is a block diagram showing another example according to the present invention.

A further example of the invention will now be described with reference to FIG. 6 in which the same reference numerals as those used in FIG. 4 designate the same elements. In the example of FIG. 6, in addition to the phase comparator 18 which reproduces the carrier wave for synchronous detection, a separate phase comparator 18a is provided for detection of the SIF signal. In this example, the VIF signal from the VIF amplifier 6 is supplied through a limiter 22 to the phase comparator 18 and is also supplied directly to the phase comparator 18a which is also supplied with the output from the $\pi/2$ phase shifter 17. The phase comparator 18a provides the SIF signal at the output terminal 12. The phase comparator 18a carries out the linear phase detecting operation expressed by the above equation (6), and the amplitude-to-frequency characteristic of the compared output from the phase comparator 18a exhibits a band pass characteristic similar to that of the phase comparator 18 of FIG. 4.

It will be apparent that many modifications and variations could be effected by one skilled in the art without departing from the spirit or scope of the present invention which is defined by the appended claims.

We claim as our invention:

1. A detector circuit for processing a received signal comprising:
   tuner means providing an intermediate frequency signal in which first and second information signals are modulated on an intermediate-frequency carrier;
   means for providing a detecting signal which is synchronized with said carrier and for providing a comparing signal which is a version of said detecting signal phase shifted by $\pi/2$, including a phase-locked loop circuit formed of a phase shifter and a controlled oscillator;
   synchronous detecting means for synchronously detecting said intermediate frequency by said detecting signal to produce said first information signal at an output thereof; and
   phase comparator means for phase-comparing said intermediate frequency signal with said comparing signal and providing a control signal to control the frequency of said controlled oscillator, so that said controlled oscillator provides said detecting signal to said synchronous detecting means and to said phase shifter, and said phase shifter provides said comparing signal to said phase comparator means, said phase comparator means also providing said second information signal at an output thereof.

2. A detector circuit according to claim 1, wherein said phase-locked loop circuit further includes a low pass filter connected between said phase comparator means and said controlled oscillator to filter said control signal.

3. A detector circuit according to claim 2, wherein said tuner means includes a mixer to which the received signal is supplied and local oscillator means for supplying a signal to said mixer to mix with said received signal to produce said intermediate frequency signal; further comprising an automatic fine tuning circuit connected between said phase-locked loop circuit and said local oscillator means to control the signal of the latter.

4. A detector circuit according to claim 3, wherein said automatic fine tuning circuit includes a DC amplifier coupled to the output of said phase comparator means and a low pass filter coupled with said DC amplifier.

5. A detector circuit according to claim 1, wherein said phase comparator means includes first and second phase comparators each supplied with said intermediate frequency signal and with said comparing signal; with the first phase comparator providing said control signal to said controlled oscillator, and the second phase comparator providing said second information signal.

6. A detector circuit according to claim 5, further comprising limiter means coupled with said first phase comparator to limit the amplitude of the intermediate frequency signal supplied thereto.

* * * * *